United States Patent [19]

Baiocchi et al.

[11] Patent Number: 5,006,409
[45] Date of Patent: Apr. 9, 1991

[54] OPTICAL ELEMENT USED TO REDUCE THE IMAGE PERCEPTION TIME

[76] Inventors: Paolo Baiocchi; Giuseppe Iori, both of Via Natta, 10/A, 43100 Parma, Italy

[21] Appl. No.: 473,339

[22] Filed: Feb. 1, 1990

[30] Foreign Application Priority Data

Feb. 9, 1989 [IT] Italy .................... 19365 A/89

[51] Int. Cl.$^5$ .......................... B32B 9/04
[52] U.S. Cl. ...................... 428/411.1; 428/412; 428/423.1; 428/480; 428/500; 351/163; 351/164; 351/165; 351/44; 106/2
[58] Field of Search ............ 351/163, 164, 165, 166, 351/162, 44; 428/411.1, 423.1, 412, 424.4, 439, 500, 480; 106/2, 19, 287.24, 287.25

[56] References Cited

U.S. PATENT DOCUMENTS 3,968,119 7/1976 Harnisch .................... 546/82

OTHER PUBLICATIONS

"Color Electrophotographic Process" Ikeda, Kokoi Tokkyo Koho, 7/31/85.

Primary Examiner—Merrell C. Cashion, Jr.
Assistant Examiner—Don Sumihiro
Attorney, Agent, or Firm—Bucknam and Archer

[57] ABSTRACT

An optical element for use in eyeglasses, visors, masks and screens to reduce the image perception time and improve the countour definition of the image comprises a transparent plastic material supporting member into which there is introduced, by suitable processing operations, 4-nitro-2-methyl-4-diethanolamino-azobenzene having the following formula 6 Claims, 1 Drawing Sheet

OPTICAL ELEMENT USED TO REDUCE THE IMAGE PERCEPTION TIME

BACKGROUND OF THE INVENTION

The present invention relates to an optical element for use in eyeglasses, visors, masks and screens to reduce the image perception time and improve the contour definition thereof.

As is known some sports activities involve high mutual speeds between a perceiving subject and an object, which speeds negatively affect the field of vision of the perceiving subject.

A like perception difficulty is moreover involved as one is in the presence of surfaces or objects having a poor optical definition, for example because of a reduced environment illumination contrast.

Such a case, for example, occurs in driving motor vehicles, practicing ski and bob sports and the like.

In these situations, it would be very important to perceive with a high speed the contours of the objects arranged in the visual field, so as to reduce the action/reaction time.

On the other hand, this high speed perception possibility would be closely related to a proper improvement of the contrast, in a given region of the visible spectrum.

In this connection it should be pointed out that, under diffused light conditions, in which the color contrast is very poor, the vision field is further reduced.

Known means for improving the human vision field provide for the use of eyeglasses including substantially yellow colored eyeglass filters: however, this means have provided poor results.

SUMMARY OF THE INVENTION

Accordingly, the main object of the present invention is to overcome the above mentioned drawbacks, by providing an optical element or medium adapted to greatly reduce the image perception time.

Another object of the present invention is to provide such an optical element or medium which is so designed and arranged as to greatly improve the optical definition of the perceived image.

Another object of the present invention is to provide such an optical element or medium which is adapted to optimally control and reduce possible environment illumination anomalies.

According to one aspect of the present invention, the above mentioned objects, as well as yet other objects, which will become more apparent hereinafter, are achieved by an optical element for use in eyeglasses, visors, masks and screens to reduce the image perception time and improve the contour definition thereof, characterized in that said optical element substantially comprises a transparent plastic supporting member including 4-nitro-2-methyl-4-diethanolamino-azobenzene having the formula

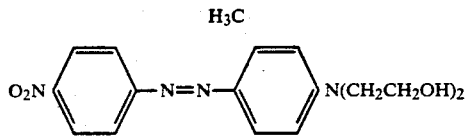

BRIEF DESCRIPTION OF THE DRAWINGS

Further characteristics and advantages of the optical element or medium according to the present invention will become more apparent from the following disclosure of some preferred embodiments thereof, which are illustrated, by way of an indicative but not limitative example, in the accompanying drawing the single figure of which shows light absorbing curves of the subject optical element, these curves being represented on a Cartesian coordinate system, the abscissa axis showing the wavelength, in nanometers, and the ordinate axis showing the optical density.

DESCRIPTION OF THE PREFERRED EMBODIMENTS

Figure 1:
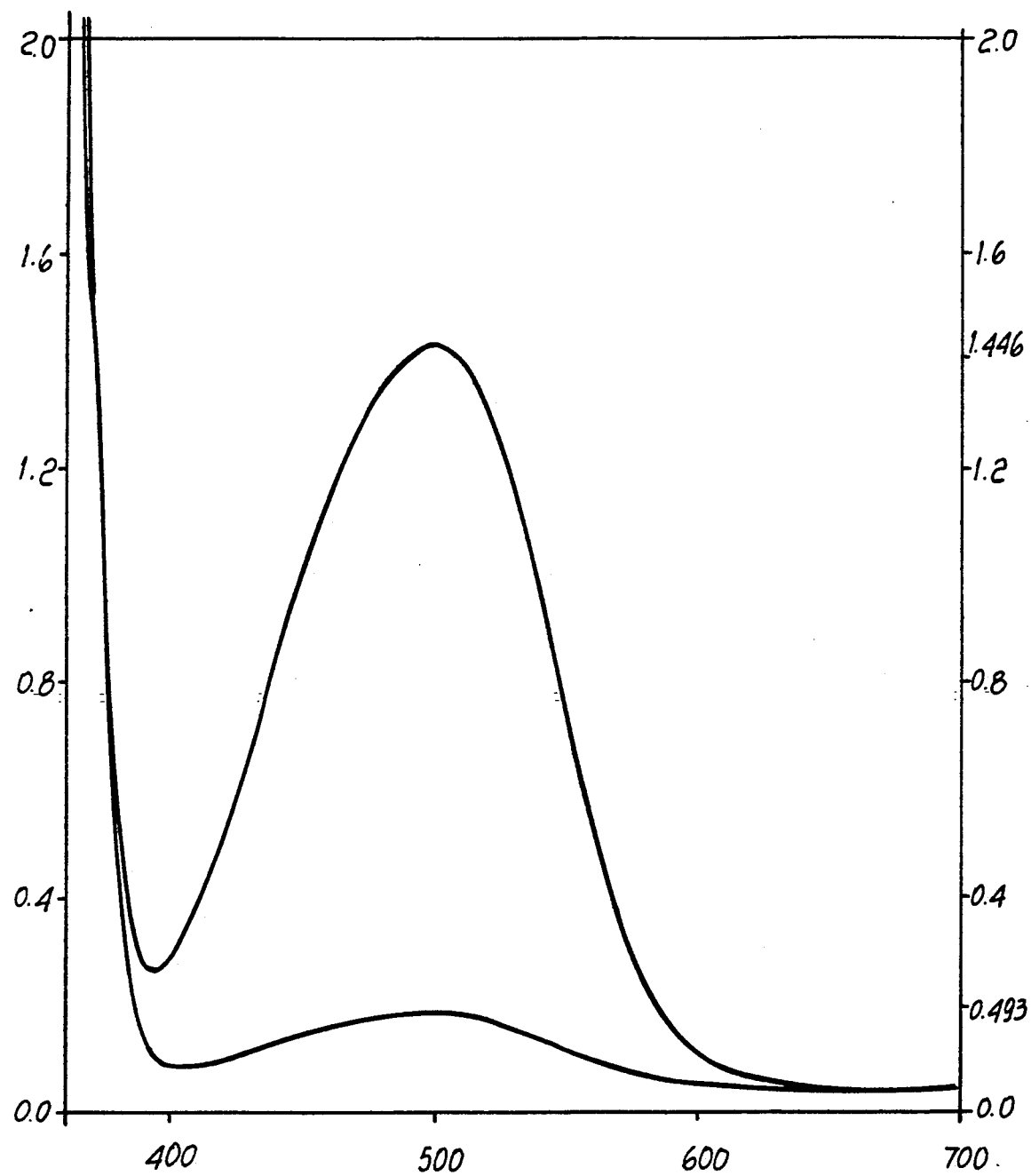

According to the invention the subject optical element or medium comprises an optically transparent or clear plastic supporting member which has been suitably processed.

The plastic supporting member must be suitable for use both as a graduated or neutral ophthalmic lens and for making masks for protecting an user face and/or clear screens in general, as well as for photographic filters.

More specifically, the subject plastic supporting member can comprise polyol-allyl-carbonate polymers (in particular the allyl-diglycolcarbonate polymer known under the trademark of CR-39), polyacrylates and polyalkylacrylates, cellulose esters (cellulose acetate, cellulose acetate-propionate, cellulose acetate butyrate, cellulose triacetate, cellulose propionate), polyurethanes, aromatic polycarbonates, polystyrene and so on.

For making the plastic support member, it is moreover possible to use clear or transparent copolymers of the above mentioned materials with other monomers such as methylmetacrylate, maleic anhydride, triallylcianurate, vinylacetate and so on.

Advantageously, in said materials there is suitably included 4-nitro-2-methyl-4-diethanolamino-azobenzene (which will be hereinafter simply called "I"), by means of substantially known methods.

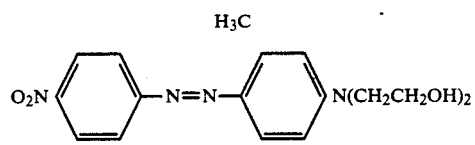

These methods practically provide a step of dispersing and/or solution processing the above mentioned compound in the clear plastic support member, according to a set concentration, which can vary from 50 ppm's to 350 ppm's (see the figure).

More specifically, the above mentioned methods provide to introduce directly into the polymeric material the compound "I", the thus obtained material being extruded in plate form, of given thickness, or molded in the form of a lens or visor, which technique is particularly suitable in the case in which thermoplastic materials are used.

Alternatively, it is possible to soak with the above mentioned compound the surface of the support member or substrate, by thermal transfer of said compound either in liquid phase (aqueous dispersion) or in a vapour phase, which latter method can be used both for thermosetting plastic material and for thermoplastic resins.

The vapour phase thermal transfer, in particular, affords the possibility of processing a single surface of the substrate, while providing the other substrate surface with different properties, such as antifogging properties.

Advantageously, also the so-called transfer printing method can be used, comprising the step of impregnating an absorbing paper with the above mentioned compound "I", the impregnated paper being then transferred onto the substrate by means of a hot air subliming step.

Thus, the presence of the compound "I" in the clear plastic support member, or on the surface thereof, is such as to change its sun light filtering characteristics, according to the light absorption curves shown in FIG. 1.

In this connection, it should be apparent to those skilled in the art that these curves exclusively show optical density variations and not selectivity variations and represent optimal solutions for all of the possible environment conditions.

In particular, it has been found that a concentration of the compound "I" in the transparent material providing a characteristic absorption peak, at 500 nm, having an optical density from 0.868 to 1.184, provides very satisfactory results under poor visibility conditions.

Other conditions, which can occur with a less frequency, can require that the optical density range be extended from 0.193 to 1.446; in this case, the choice within such a range must be performed depending on the illumination density, environment characteristics and visual sensitivy of the single users.

While the invention has been disclosed and illustrated with reference to some preferred embodiments thereof, it should be apparent that the disclosed embodiments are susceptible to several modifications and variations, all of which will come within the spirit and scope of the appended claims.

I claim:

1. An optical element for use in eyeglasses, visors, masks and screens to reduce an image perception time and improve a contour definition thereof, wherein said optical element comprises a transparent plastic supporting member including 4-nitro-2-methyl-4-diethanolamino-azobenzene from 50 ppm to 350 ppm.

2. An optical element according to claim 1, wherein said transparent plastic support members are selected from the group consisting of polymers of polyolallylcarbonate, polyacrylates and polyalkylacrylates, a cellulose esters which is cellulose acetate, cellulose acetate-propionate, cellulose acetate-butyrate, cellulose triacetate, cellulose propionate, polyurethanes, aromatic polycarbonates and polystyrene.

3. An optical element according to claim 1, wherein said transparent plastic support members are selected from the group consisting of copolymers of polyolallylcarbonate, polyacrylates and polyalkylacrylates, cellulose acetate, cellulose acetate-propionate, cellulose acetate butyrate, cellulose triacetate, cellulose propionate, polyurethanes, aromatic polycarbonates with methylmethacrylate, maleic anydride, triallylkyanurate and, vinylacetate.

4. An optical element according to claim 1, wherein said 4-nitro-2-methyl-4-diethanolamino-azobenzene is directly introduced into a polymeric material, which is then plate extruded.

5. An optical element according to claim 1, wherein said 4-nitro-2-methyl-4-diethanolamino-azobenzene is applied on a surface of said transparent plastic support member by a thermal transfer process, either in a liquid phase or a vapor phase.

6. An optical element according to claim 1, wherein said support member has a single surface thereof processed by said 4-nitro-2-methyl-4-diethanolamino-azobenzene.

* * * * *